Patented June 29, 1943

2,322,783

UNITED STATES PATENT OFFICE 2,322,783

PREPARATION OF AMIDES

Morris Katzman and Albert K. Epstein, Chicago, Ill., assignors to The Emulsol Corporation, Chicago, Ill., a corporation of Illinois No Drawing. Application August 23, 1941, Serial No. 408,070

11 Claims. (Cl. 260—404)

This invention relates to the preparation of amides of polycarboxylic acids and is particularly concerned with a novel and highly satisfactory process for producing such compounds.

Methods heretofore suggested for the preparation of amides of polycarboxylic acids have all been characterized by certain disadvantages, in general being brought about by the polyfunctional groups in the polycarboxylic acids. Instead of obtaining the desired products, gummy and resinous materials are frequently formed, yields are low, and products of poor water-solubility are in many instances obtained. In accordance with our invention, these and other objections and disadvantages are obviated.

In general, our novel method comprises providing a solution or dispersion of a nitrogenous compound containing at least one hydrogen atom directly attached to nitrogen and replaceable by an acyl radical, and particularly an inorganic salt of such a compound, such as the hydrochloride, an anhydride of a polycarboxylic acid, and water, and adding an alkaline material thereto, the reaction mixture being maintained preferably at relatively low temperatures.

In order that the nature of the invention will be apparent, the following illustrative examples are set forth. It will be understood that various changes may be made without in any way departing from the spirit of the novel teachings disclosed herein. Thus, for example, different reactant materials may be utilized, the proportions may be modified, the temperatures and times of reaction are subject to some variations, and other changes may be made as will be apparent to those versed in the art in the light of the guiding principles which are disclosed herein.

Example 1

(a) 28.1 grams of the hydrochloride of the lauric acid ester of monoethanolamine (produced as described in the application of Frank J. Cahn, Serial No. 364,032, filed November 2, 1940), 11.0 grams of maleic acid anhydride, and 250 cc. of water at about 8 degrees C. were mixed together and well stirred, the mixture being maintained in an ice bath. There was then added slowly, with stirring, a solution of 8.8 grams of sodium hydroxide dissolved in 250 cc. of water, said solution having a temperature of about 10 degrees C. The sodium hydroxide solution was added over a period of about 10 minutes during which time the temperature rose to about 16 degrees C. The reaction mixture was neutral to litmus. 0.8 gram of sodium hydroxide was then added to make said solution just neutral to phenolphthalein. The reaction mixture was then allowed to stand in the ice bath for about 15 minutes more, the temperature remaining substantially at about 15 degrees C. The reaction mixture comprised a solution containing a substantial proportion of the sodium salt of the maleic acid amide of the lauric acid ester of monoethanolamine, which compound has the following formula:

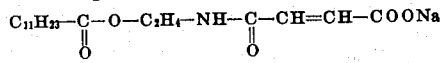

(b) To the reaction mixture of part a hereof, 15 grams of sodium bisulphite were added and the mixture was heated for about 15 minutes, the reaction temperature being between 60 degrees C. and 85 degrees C. One gram of sodium hydroxide was then added to make the solution neutral to litmus. The solution may be evaporated in order to increase the concentration of the desired reaction product. Said reaction product contained substantial proportions of a compound having the following formula:

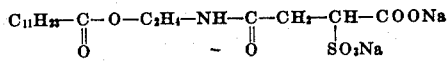

This product had good lathering, faoming, wetting, and, in general, surface modifying properties.

Example 2

27 grams of the hydrochloride of the lauric acid ester of monoethanolamine, 11 grams of succinic anhydride, and 250 cc. of cold water were mixed together and placed in an ice bath. There was then added thereto, slowly and with stirring, a cold solution of 9 grams of sodium hydroxide in 50 cc. of water. The sodium hydroxide solution was added over a period of about 10 minutes and the temperature rose from about 11 degrees C. to about 17 degrees C. The reaction product was then filtered. It comprised a clear amber-colored solution, neutral to litmus, had good foaming properties in neutral and alkaline media but did not foam in acid media. The reaction mixture contained a substantial proportion of a compound having the following formula:

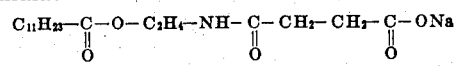

Example 3

37 grams of the hydrochloride of the stearic acid ester of monoethanolamine (prepared as described in application of Frank J. Cahn, Serial No. 364,032, filed November 2, 1940), 250 cc. of water at 5 degrees C., and 16.5 grams of powdered phthalic anhydride were mixed together and, while stirring and maintaining the reaction mixture in an ice-water bath, there was slowly added a solution of 9 grams of sodium hydroxide dissolved in 250 cc. of water, the alkali solution having a temperature of about 10 degrees C. The alkali solution was added over a period of about 15 minutes and the temperature rose to about 11 degrees C. The reaction mixture was just neutral to litmus and one gram of sodium hydroxide was added thereto, with stirring, to render the mixture neutral to phenolphthalein. The product was a white, somewhat viscous paste, having good emulsifying and surface modifying properties. Upon drying of the paste material in a steam bath, a white powder was obtained having the formula:

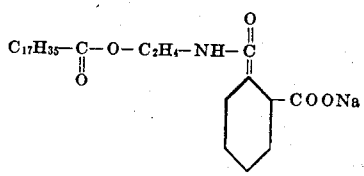

Example 4

27.5 grams of the hydrochloride of the lauric acid ester of monoethanolamine were admixed with 250 cc. of water at about 2 degrees C. and there were then added thereto, with stirring, 250 grams of powdered sulpho-phthalic anhydride

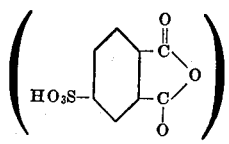

To the resulting mixture there was added a solution of 13.5 grams of sodium hydroxide in 250 cc. of cold water. The addition of the alkaline solution took place over a period of about 15 minutes and the temperature rose to about 6 degrees C. The reaction mixture was then warmed up to 30 degrees C. The product was a clear solution which had foaming properties in both acid and alkaline media. It contained a substantial proportion of a compound having the formula

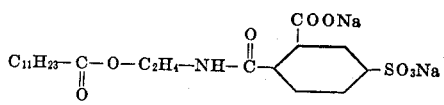

The solution may be concentrated or extracted to recover the aforesaid compound.

Example 5

30 grams of the hydrochlorides of coconut oil mixed fatty acid esters of monoethanolamine were admixed with 250 cc. of water at about 2 degrees C. and there were then added thereto 20 grams of sulpho-maleic anhydride. There was then added, dropwise and with stirring, a solution of 25 grams of potassium hydroxide in 250 cc. of water at about 2 degrees C. to 3 degrees C. The addition of the alkali solution took place over a period of about 25 minutes at the end of which time the temperature of the reaction mixture was about 2 degrees C. The reaction mixture was then warmed to 25 degrees C. It was a clear solution having excellent foaming and lathering properties. It contained a substantial proportion of a compound having the formula:

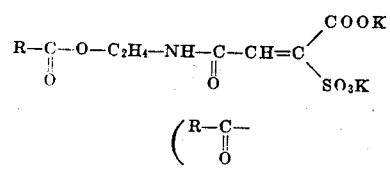

represents the acyl radical of the coconut oil mixed fatty acids.)

Example 6

(a) 39.3 grams of the hydrochloride of the caprylic acid di-ester of diethanolamine were admixed with 250 cc. of water at about 5 degrees C. and there were then added, with stirring and cooling, 28.5 grams of dibrom succinic anhydride. There was then added slowly a solution of 5 grams of sodium hydroxide in 250 cc. of water, said alkali solution having a temperature of about 3 degrees C. The addition of the alkali solution took place over a period of about 16 minutes and the temperature of the reaction mixture rose to about 5 degrees C. It was then warmed to 35 degrees C. with stirring. The reaction product was an amber-colored, oily material and contained a substantial proportion of a compound having the formula

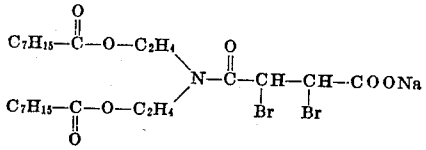

(b) 30 grams of reaction mixture of part a were admixed with 200 cc. of water and 20 grams of sodium sulphite and the mixture was heated and stirred for 30 minutes at a temperature of about 80 degrees C. The reaction product had good foaming and lathering properties. It contained a substantial proportion of a compound having the formula

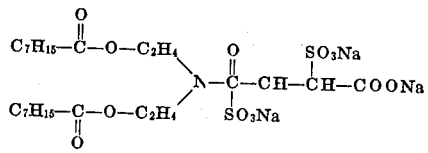

(c) 30 grams of the reaction mixture of part a were dissolved in 30 cc. of pyridine and the mixture was warmed to 60 degrees C. and allowed to stand for several hours. The reaction product was a semi-viscous reddish mass. It was washed with 3 successive portions of 200 cc. of petroleum ether and filtered and then evacuated. The product, when dry, was a medium brown colored solid having surface modifying properties and consisted essentially of a compound having the formula:

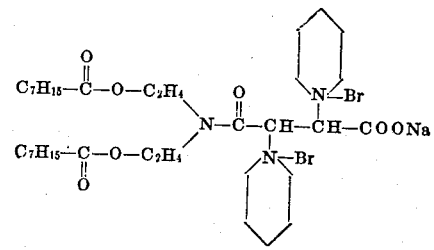

Example 7

To 55 grams of a 40% solution of monoethanolamine sulphate, cooled to 10 degrees C., there were added with stirring, 11 grams of maleic anhydride and 200 cc. of water. The mixture was again cooled to 10 degrees C. and there were added thereto, slowly and with stirring, 9 grams of sodium hydroxide previously dissolved in 250 cc. of water, said alkali solution also being cooled to 10 degrees C. The temperature rose to 25 degrees C. during the reaction. The reaction product was a clear solution, just alkaline to phenolphthalein and comprised a compound having the formula

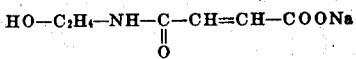

Example 8

To 6.1 grams of monoethanolamine dissolved in 250 cc. of water and cooled to 5 degrees C. there were added slowly, over a period of 10 minutes, with stirring and cooling in an ice bath, 11 grams of maleic anhydride. There were then slowly added 4.5 grams of sodium hydroxide previously dissolved in 250 cc. of water and cooled to 10 degrees C. The reaction mixture was stirred and maintained at about 10 degrees C. The reaction mixture contained a compound having the same structural formula as that produced in accordance with Example 7.

Example 9

28.1 grams of the hydrochloride of the lauric acid ester of monoethanolamine were dissolved in 250 cc. of water at 50 degrees C. The resulting solution was cooled down to 10 degrees C. and there were then added 24 grams of diacetyl tartaric acid anhydride. To the resulting mixture there were added, dropwise and with stirring and cooling, a solution of 9 grams of sodium hydroxide dissolved in 250 cc. of water. The alkali solution, at the time of the addition, had a temperature of 2 degrees C. The addition of the alkali solution took place over a period of about 15 minutes, the temperature of the mixture rising to 17 degrees C. The reaction mixture, which had foaming properties in alkaline and also in acid media, contained a compound having the formula

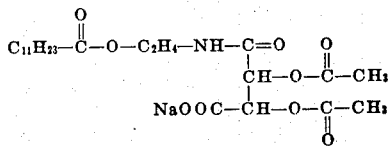

Example 10

(a) 21.7 grams of lauryl amine and 250 cc. of water were cooled to 5 degrees C. and 16.8 grams of maleic anhydride were added thereto. To the resulting mixture there were added, slowly and with stirring, 8.5 grams of sodium hydroxide dissolved in 250 cc. of water. At the end of an hour the temperature of the reaction product rose to 30 degrees C. The reaction product, which was just alkaline to phenolphthalein and which foamed in alkaline media, contained a compound having the formula

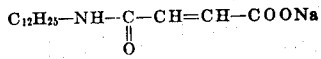

(b) To the reaction product of part a hereof 25 grams of sodium bisulphite were added and the mixture was heated, with stirring, for one-half hour at about 80 degrees C. The resulting product, which foamed in alkaline and acid media, contained a product having the formula

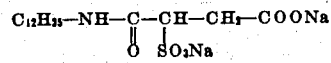

The nitrogenous compounds containing replaceable hydrogen directly attached to nitrogen which may be acylated in accordance with the teachings of the present invention include mono-, di-, and poly-amines, simple and compound, normal and iso-, of aliphatic, cyclo-aliphatic, aromatic or aromatic-aliphatic character including, particularly the aliphatic straight chain and branched chain amines, for example, ethyl amine, propyl amine, isopropyl amine, butyryl amine, amyl amine, iso-amyl amine, hexyl amine, heptyl amine, octyl amine, nonyl amine, decyl amine, undecyl amine, dodecyl amine, myristyl amine, cetyl amine, oleyl amine, linoleyl amine, stearyl amine, ricinoleyl amine, palmitoleyl amine, melissyl amine, ceryl amine, carnaubyl amine, myricyl amine, branched chain octyl, decyl, dodecyl, tetradecyl, hexadecyl, and octadecyl aliphatic amines as, for example, 2-ethyl hexyl amine-1, 2-n butyl octyl amine-1, 2-butyl tetra decyl amine-1, and, in general, the higher molecular weight saturated and unsaturated aliphatic straight chain and branched chain amines. Other amines which may be acylated in accordance with our invention are cyclo-aliphatic or ali-cyclic amines and aromatic aliphatic amines such as cyclo-hexyl amines, aniline, benzylamine, p-amino phenol, diamino phenols, and homologues and derivatives thereof, monoethylaniline, and the like. These amines may contain substituent groups of various character. It is obvious, of course, that mixtures of any two or more of the above-mentioned and similar amines may be utilized and, indeed, in commercial practice it will usually be found that commercial mixtures of such amines are more readily available and, therefore, more economical to employ.

Among the nitrogenous compounds containing replaceable hydrogen directly attached to nitrogen which may be reacted to produce amides in accordance with the present invention are also hydroxy primary or secondary amines or, in other words, non-tertiary amines, and the esters thereof, particularly the inorganic acid salts of said esters, such as the hydrochloride. A representative group of such hydroxy-amines include symmetrical, unsymmetrical, normal and isoderivatives, such as monoethanolamine, diethanolamine, monopropanolamine, dipropanolamine, monobutanolamine, mono-isobutanolamine, monopentanolamine, dibutanolamine, dipentanolamine, mono- and di-hexanolamine, mono- and di-octanolamine, mono- and di-decylolamine, mono-laurylolamine, mono-hexa-decyclolamine, mono-octadecylolamine, mono-ethyl ethanolamine, mono-butyl ethanolamine; arylolamines and cyclic hydroxy amines such as cyclohexyl ethanolamine; N-cyclohexyl butanolamine, ethanolaniline, phenylethanolamine, p-amino phenol

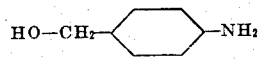

2-methylamino-propan-diol-1,3; 1-phenyl-amino-propan-diol-2,3; 1-hydroxy-ethylamino-2, methoxy-propan-ol-3; 2-N-methylamino-propan-diol-1,3; monoethanol monopropanolamine, monoethanol monobutanolamine, alkylol poly-amines such as alkylol derivatives of ethylene diamine, diethylene triamine, and triethylene tetraamine as, for example, hydroxy-ethyl ethylene diamine; diglycerol mono-amine; diglycerol di-amine; hydroxy-amines derived from other polyhydric alcohols, including glycols, sugars and sugar alcohols such as ethylene glycol, diethylene glycol, dextrose, sucrose, sorbitol, mannitol and dulcitol;

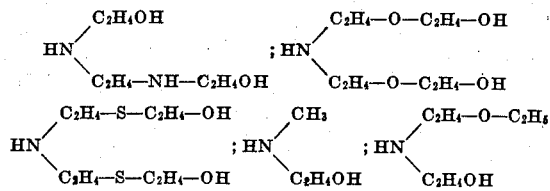

and the like; 1-amino-2,3-propanediol, 2-amino-1,3-propanediol; 2-amino - 2 - methyl - 1,3 - propanediol; trimethylol amino methane; 2-amino-2-n-propyl-1,3-propanediol; 2-amino-2-isopropyl-1,3-propanediol; 2-amino-2-methyl-1,4-butanediol; 2-amino- 2 - methyl - 1,5 - pentanediol; 2-amino- 2 -ethyl - 1,3 - propanediol; 2-amino-2-ethylol-1,3-propanediol; 2-amino-2-methyl-1,6-hexanediol; 1-amino-1,1-dimethyl ethanol; trimethylol amino-methyl methane; trimethylol amino- methylol methane. Polymerized hydroxy non-tertiary amines or polymerized hydroxy amines containing hydrogen directly attached to nitrogen and prepared, for example, by polymerizing monoethanolamine or diethanolamine or mixtures thereof, or other hydroxy amines such as those mentioned hereinabove, particularly in the presence of a catalyst such as sodium hydroxide or the like, may also be employed. The preparation of polymerized hydroxy amines is disclosed, for example, in United States Patent No. 2,178,173. Homologues and substitution derivatives of the above-mentioned hydroxy amines may also be utilized. It will be understood that the hydroxy primary and secondary amines may be utilized in pure, impure or commercial form. The alcohol or alkylol radicals of the alcohol amines or alkylolamines may contain substituent groups such as amino, nitrile, carboxyl, hydroxy, halogen, sulphate, sulphonic, phosphate, and the like and the sequence of carbon atoms therein may be interrupted by O, S, C=O, NH, NR where R is lower alkyl, and the like.

Still other nitrogenous compounds containing at least one hydrogen atom directly attached to nitrogen and replaceable by an acyl radical include proteins and degradation products thereof such as peptones, polypeptides, amino acids such as glycine, alanine, and the like as well as amino higher molecular weight fatty acids such as amino lauric acids, amino stearic acids, and the like.

The anhydrides of the polycarboxylic acids utilized in the reaction may be of varying character, as is clear from the examples set forth hereinabove. They may be anhydrides of polycarboxylic acids, of aliphatic or aromatic character, and they may contain substituent groups such as sulphonic, sulphate, phosphate, and the like. Illustrative examples of such anhydrides are glutaric anhydride, citraconic anhydride, malonic anhydride, mesaconic anhydride, itaconic anhydride, adipic anhydride, pimelic anhydride, mucic anhydride, sebacic anhydride, aconitic anhydride, suberic anhydride, azelaic anhydride, diacetyl tartaric acid anhydride, acetyl citric acid anhydride, phthalic anhydride, sulphophthalic anhydride, maleic anhydride, succinic anhydride, and the like. The process is particularly advantageous in the case where cyclic anhydrides, and especially the anhydrides of the lower molecular weight aliphatic unsaturated polycarboxylic acids, notably maleic anhydride, are employed.

As we have pointed out hereinabove, for best results the process is carried out at relatively low temperatures. While the process may, in certain cases, be practiced at temperatures as high as 50 degrees C., or even somewhat higher, we prefer to utilize temperatures close to 0 degrees C. although an excellent operating range is from about 5 degrees C. to about 15 degrees C. to 20 degrees C. In general, the reactions should be conducted at temperatures below those at which the anhydrides employed appreciably hydrolyze.

While, in the examples given, we have utilized sodium hydroxide and potassium hydroxide as the alkalies, other alkalies and alkaline materials may be substituted therefor such as trisodium phosphate, sodium carbonate, calcium hydroxide, magnesium oxide and hydroxide, triethanolamine, trimethylamine, tetra-ethyl ammonium hydroxide, tetra-ethanolammonium hydroxide, and the like. The term "alkali" is used in a generic sense in the claims to cover these and other alkaline materials.

The term "higher," as used in the claims, will be understood to cover at least eight carbon atoms and, concomitantly, the term "lower" will be understood to mean less than eight carbon atoms.

What we claim as new and desire to protect by Letters Patent of the United States is:

1. A method of preparing amides which comprises providing a mixture including a nitrogenous compound containing hydrogen directly attached to nitrogen and replaceable by an acyl radical, an anhydride of a polycarboxylic acid, and water, maintaining the mixture at temperatures not exceeding 50° C., and adding an alkali to the mixture.

2. A method of preparing amides which comprises providing a mixture including an aliphatic nitrogenous compound containing hydrogen directly attached to nitrogen and replaceable by an acyl radical, an anhydride of an aliphatic polycarboxylic acid, and water, maintaining the mixture at a temperature not exceeding 50° C., and adding an alkali to the mixture.

3. A method of preparing amides which comprises providing a mixture including a water-soluble, aliphatic nitrogenous compound containing hydrogen directly attached to nitrogen and replaceable by an acyl radical, an anhydride of a polycarboxylic acid, and water, maintaining the mixture at a temperature of the order of 5 degrees C. to 20 degrees C., and adding an alkali to the mixture.

4. A method of preparing amides which comprises admixing an inorganic acid salt of a nitrogenous compound containing hydrogen directly attached to nitrogen and replaceable by an acyl radical, in an aqueous medium, at temperatures not exceeding 50° C., with an anhydride of an aliphatic polycarboxylic acid, and adding an alkali to the mixture.

5. A method of preparing amides which comprises admixing an inorganic acid salt of a nitrogenous compound containing two hydrogen atoms directly attached to nitrogen and replaceable by acyl radicals, in an aqueous medium, at temperatures not exceeding 50° C., with a cyclic anhydride of a polycarboxylic acid, and adding an alkali to the mixture.

6. A method of preparing amides which comprises admixing a hydrochloride of an aliphatic compound containing two hydrogen atoms directly attached to nitrogen and replaceable by acyl radicals, in an aqueous medium, at temperatures not exceeding 50° C., with an anhydride of a water-soluble unsaturated polycarboxylinc acid, and adding an alkali to the mixture.

7. A method of preparing amides which comprises admixing a hydrochloride of an aliphatic compound containing two hydrogen atoms directly attached to nitrogen and replaceable by acyl radicals, in an aqueous medium, at temperatures not exceeding 50° C., with maleic anhydride, and adding an alkali to the mixture.

8. A method of preparing amides which comprises admixing a hydrochloride of an aliphatic compound containing two hydrogen atoms directly attached to nitrogen and replaceable by acyl radicals, in an aqueous medium, at temperatures not exceeding 50° C., with an anhydride of an aliphatic polycarboxylic acid, and adding an aqueous solution of an alkali to the mixture.

9. A method of preparing amides which comprises providing a mixture including a higher molecular weight nitrogenous compound containing hydrogen directly attached to nitrogen and replaceable by an acyl radical, an anhydride of a polycarboxylic acid, and water, maintaining the mixture at temperatures not exceeding 50° C., and adding an alkali to the mixture.

10. A method of preparing amides which comprises providing a mixture including an aliphatic nitrogenous compound containing hydrogen directly attached to nitrogen and replaceable by an acyl radical, said nitrogenous compound containing a higher molecular weight aliphatic radical, an anhydride of an aliphatic unsaturated polycarboxylic acid, and water, maintaining the mixture at a temperature not exceeding 50° C., and adding an alkali to the mixture.

11. A method of preparing amides which comprises providing a mixture including a water-soluble, aliphatic nitrogenous compound containing hydrogen directly attached to nitrogen and replaceable by an acyl radical, a cyclic anhydride of a polycarboxylic acid, and water, maintaining the mixture at a temperature of the order of 5 degrees C. to 20 degrees C., and adding an alkali to the mixture.

MORRIS KATZMAN.
ALBERT K. EPSTEIN.